United States Patent
Martin

[15] 3,696,882
[45] Oct. 10, 1972

[54] METHOD FOR GUIDING VEHICLES AUTOMATICALLY ALONG A PREDETERMINED PATH

[72] Inventor: Helmut Martin, Hannover, Germany

[73] Assignee: Kabel-und Metallwerke Gutehoffnungshutte Aktiengesellschaft, Hannover, Germany

[22] Filed: Jan. 27, 1971

[21] Appl. No.: 110,063

[30] Foreign Application Priority Data

Feb. 13, 1970 Germany..........P 20 06 581.0

[52] U.S. Cl....................180/98, 340/32, 180/105 E
[51] Int. Cl..............................................B60k 31/00
[58] Field of Search.........180/98, 82, 105 E; 246/29, 246/30, 182 R, 167 R; 340/22, 23, 32

[56] References Cited

UNITED STATES PATENTS

| | | |
|---|---|---|
| 2,141,282 | 12/1938 | Southworth et al......180/82 X |
| 2,317,400 | 4/1943 | Paulus et al.........246/167 R X |
| 2,576,424 | 11/1951 | Sunstein...................340/22 X |
| 2,698,377 | 12/1954 | Korman........................246/30 |
| 3,018,368 | 1/1962 | Mountjoy.................180/98 X |
| 3,195,671 | 7/1965 | Wolfe...........................180/98 |
| 3,327,111 | 6/1967 | French et al...........246/182 R |

Primary Examiner—Kenneth H. Betts
Attorney—Smyth, Roston & Pavitt

[57] ABSTRACT

Low rate propagation of descrete phase points between two oppositely propagation and slightly detuned frequencies is used for motion control of vehicles along a prescribed path.

9 Claims, 1 Drawing Figure

PATENTED OCT 10 1972　　3,696,882
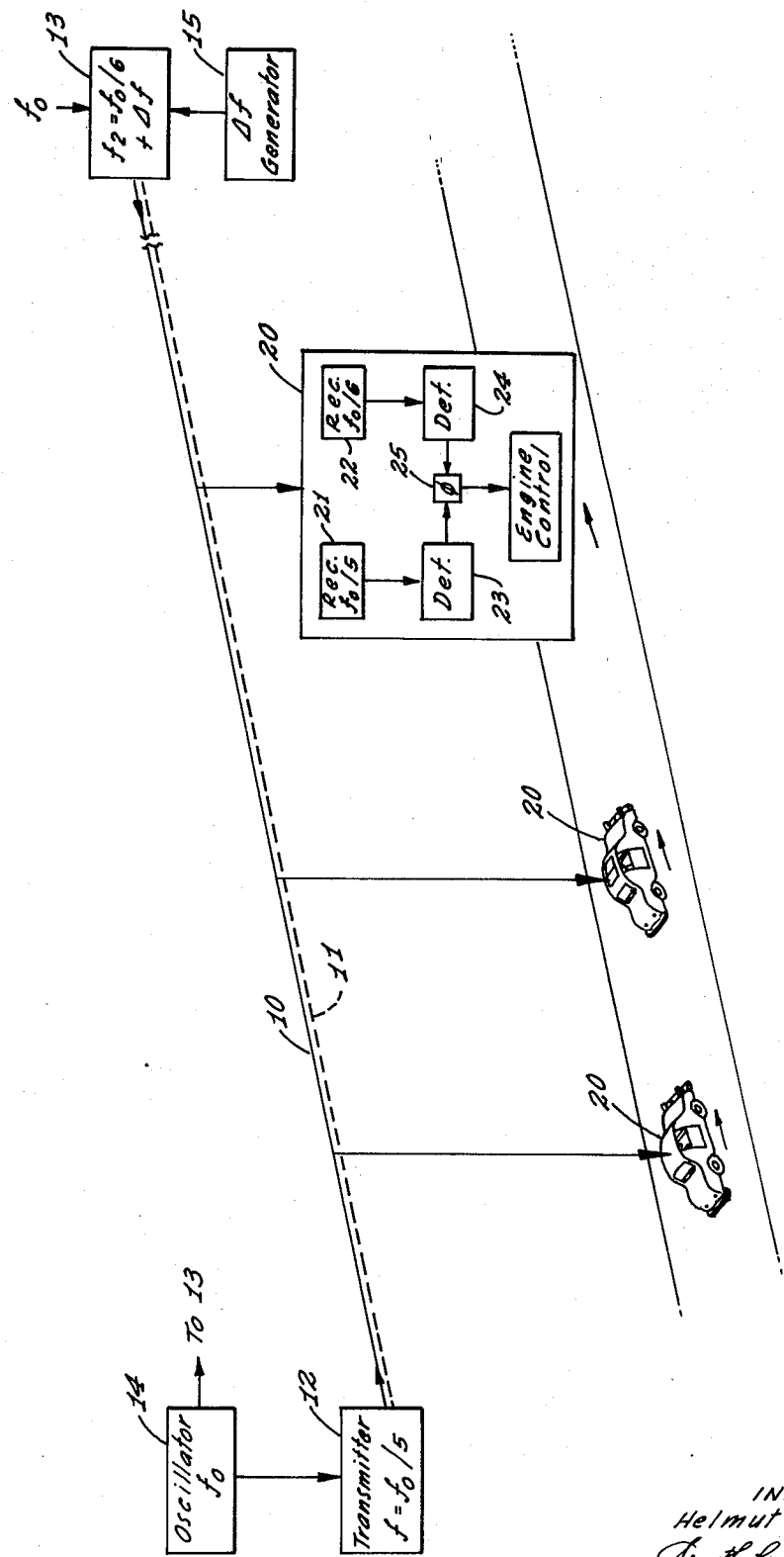
INVENTOR:
Helmut Martin

METHOD FOR GUIDING VEHICLES AUTOMATICALLY ALONG A PREDETERMINED PATH

The present invention relates to a method for guiding vehicles automatically along a predetermined path. In particular, the invention relates to a method for guiding motor vehicles along streets and highways by means of controlled motion. The invention requires employment of high frequency cable means, disposed along the path and characterized by development of a partial external field.

The background of the invention is essentially based on the ever increasing traffic density and the corresponding increasing need for greater safety. The object of the invention is to permit vehicles, for example, automobiles to run on streets or highways without driver intervention. A method purporting to establish such a system must fulfill the following requirements. First, the vehicle must remain on a predetermined track. Second, all vehicles that run on the same track must have the same speed or must follow a change in speed in a particularly controlled manner so that, thirdly, all vehicles on that track maintain a safe distance from each other. There is no doubt that such a system and the equipment for practicing such a method requires a great deal of expenditure and investment for any extensive highway and superhighway systems to be so equipped. However, such investment cannot longer be avoided in view of rapid deterioration of traffic safety on present day roads that do not provide for such automatic control.

It is an object of the invention to suggest a method and system for guiding vehicles along a track at very low expenditure, and which permits these requirements to be met. The method suggested in accordance with the preferred embodiment of the present invention provides for the following steps. As stated, a high frequency cable that develops a partial external field along its extension is to be provided along the vehicle's path, road or track. It is convenient but not essential in principle to provide such cable in the center of any lane if the method is used for control of automobiles. Alternatively, the cable may be installed next to the road or in-between two lanes for servicing both of them. For a given highway or street section, that cable has two terminal points which are to be connected to two transmitters feeding high frequency energy into that cable for propagation therein in opposite directions. However, the frequencies differ in that they are both approximately subharmonics of a particular control frequency, i.e., the two transmitted frequencies are to have approximately a common harmonic. The particular control frequency or harmonic has been derived from, or is developed by, a common frequency standard. The term "approximate" is to mean that at least one of the transmitted frequencies differs from a true subharmonic of that particular frequency in a controlled manner.

The vehicles are equipped with receivers tuned to the transmitted frequencies. Comparable harmonics are extracted from the two received signals, and circuitry connected to the receivers compare the phase of the two separately developed harmonics. The phase comparison is used to track discrete phase points along the cable corresponding to predetermined phase relation between the two harmonics. Since at least one of the two transmitter frequencies deviates from being a true subharmonic of the control frequency, the discrete phase points propagate along the cable at a speed represented by that deviation. Thus, tracking of these moving phase points requires the vehicle to move along the road at that speed which is the desired and controlled speed for all vehicles along the cable. The receivers and connected circuitry in the vehicles are adjusted to provide a command for controlling vehicle motion to maintain position in relation to a discrete point as propagating in particular direction along the cable.

The discrete points are preferably selected by phase difference of 90° or 270° (i.e., + or $-\pi/2$) of the control frequency because phase detectors are usually constructed to provide zero d-c output for such a phase relation. If the two transmitter frequencies are precisely subharmonics of the particular frequency, the phase of the two signals of the particular control frequency, as extracted from the two received subharmonics is constant, i.e., such a discrete phase point is stationary. As the frequency of at least one transmitter is varied from that relation, the phase points along the cable are set into motion. The speed is essentially freely selectable corresponding to adjustment of one (or in both) transmitters.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates schematically a system for practicing the method of the invention.

Take any street, highway, superhighway etc., a high frequency cable 10 is layed on that road, for example, in the center of or along a lane. The disposition of the cable is illustrated schematically only, but an overhead installation is likewise possible. The cable may be a coaxial cable with a core and a shield surrounding the core but having an axially extending slit to develop a partial field 11 external to the shield and outer conductor of the cable.

The cable extends over a particular stretch of the road and has two ends; there are provided two transmitters, 12 and 13, feeding high frequency energy into the cable from opposite ends to propagate through the cable in opposite directions. Transmitter 12 on one end of the cable provides, for example, high frequency energy at a frequency f1; transmitter 13 on the other end of the transmission line provides high frequency energy at a frequency f2. In the illustrated example it is assumed that frequency f1 is precisely the fifth subharmonic of a signal frequency $fo$, i.e., $f1 = fo/5$. The frequency $f2$ is merely approximately the sixth subharmonic of that frequency fo, i.e., $f2 = fo/6 + \Delta f$. Frequency fo is the critical control frequency of the system.

As far as the transmission system is concerned, it is necessary that the two transmitters operate in predetermined synchronism. Particularly, the relative values of the frequencies are critical, so that it is necessary to make sure that operation of both transmitters relates particularly to the same control frequency $fo$. Therefore, there is provided a frequency standard or master oscillator 14 which provides that control frequency $fo$. Master oscillator 14 can be located anywhere, but conveniently it is disposed at one of the locations for the transmitters. In the present example, the oscillator 14 is presumed to be located at transmitter 12 and separate transmission means may be located at transmitter 12 and separate transmission means may be provided to transmit that frequency $fo$ to the other transmitter 13 for utilization therein. The frequency $fo$ may be transmitted in form of carrier modulated Rf transmission or via cable etc. Conceivably however, transmitter station 13 receives signal $fo/5$, extracts therefrom $fo$ and constructs therefrom signal $fo/6$.

Speaking generally, the transmitters use control frequency $fo$, and they derive therefrom respective two subharmonic, namely, $fo/5$ in transmitter 12, and $fo/6$ in transmitter 13. The signal, as transmitted by transmitter 13, is modulated additionally as will be explained shortly. To develop the description of the system, it may be assumed presently that $\Delta f = 0$. Signals of the two subharmonics of $fo$ are fed into the cable system, so that $fo$ can be extracted from either transmitted signal along the road. It is required that the propagation speed for the two frequencies is uniform along the high frequency cable (subject to intentional variation as will be explained below). In view of the fact that, generally, two waves of the same frequency and propagating in opposite direction, produce a standing wave when combined, two such waves without combining produce time independent constant phase points between the two waves, corresponding to nodes of a standing wave. These constant phase points are preferably selected as discrete points and they are stationary along the cable (at a distance spaced apart by a half a wavelength of the signal frequency $fo$).

As stated, any vehicle 20 travelling on that road includes two receivers, such as 21 and 22, and is in that respect similar equipped as an aircraft for the so-called Decca method in air navigation. The two receivers are individually tuned to the two different frequencies $fo/5$ and $fo/6$, respectively, and receive them separately accordingly. These two signals, as separately received, are individually transformed in detector circuits 23 and 24 respectively, whereby circuit 23 provides the fifth harmonic of the signal it receives (which is $fo$) while circuit 24 provides the sixth harmonic of the signal it receives, which is also $fo$, as long as both transmitter frequencies are precisely subharmonics of that frequency.

The two thusly gained signals of the frequency $fo$ are compared as to their phase in a phase detector 25, constructed, for example, to provide zero output for $+90°$, or for a $-90°$ phase difference, depending upon its construction. Positive or negative d-c outputs of the phase detector 25 represent a displacement of the vehicle in one or the other direction from such a phase point. That phase detector output, thus, represents actual physical alignment or misalignment of the vehicle with a discrete, constant phase point as defined. Conversely, one can say that such a phase point is defined where the particular phase detector produces zero output.

The receiver equipment on the vehicle generally is coupled to a follower control system in that the output of detector 25 provides a command signal for control of the gasoline feed to the carburetor in the vehicle (and, possibly, also to the brake system).

Without further measures, the vehicle would be moved into alignment with a stationary discrete point and stay there. This situation may well occur if for reasons of an emergency the entire traffic on that road is to be halted.

After having described the stationary case, I proceed to the description of the speed control case. For this, the discrete points are set into motion, and the circuit in a vehicle operates to control speed and disposition of the vehicle to be equal to the speed and location of the closest discrete point as propagating along the cable. The phase comparison and resulting output causes the vehicle to track the propagating discrete point.

The speed of the discrete points are determined in that the frequency of one transmitter, e.g., transmitter 13, is changed by an incremental value $\Delta f$, i.e., $f2 = fo/6 + \Delta f$, with $\Delta f > 0$. The $\Delta f$-generator is denoted with reference numeral 15 in the drawing. The sixth harmonic of the signal frequency as now transmitted by transmitter 13 is no longer precisely $fo$, but the detuned signal frequency $f2$ is still within the band width of receiver 24. Therefore, the discrete point, defined as a particular phase ($\pm 90°$) of the fifth and sixth harmonic of the two transmitter frequencies as received will no longer be stationary but propagates along the cable. For $\Delta f > 0$, the discrete phase points in question move from transmitter 12 to transmitter 13, for $\Delta f < 0$ the direction is the opposite one.

The velocity $Vk$ of the discrete phase points is given by the relation $$Vk = Vo \cdot \Delta f/(2 \cdot f2)$$

wherein $Vo$ is the propagation speed for the signal in and along cable 10. The phase detector 25 in each vehicle tracks the closest discrete phase point and, thus, moves at that speed $Vk$.

It is, of course, possible to decrease the output frequency of transmitter 12 by the same amount or to detune both transmitter frequencies oppositely, each by half of that amount $\Delta f$. However, that latter method is mentioned here only for reasons of completion, as it is obviously simpler to change but one of the two transmitter frequencies, particularly in case controlled variation of the speed is desired Also, in that case, a constant frequency output of the respective other transmitter (in the example, transmitter 12) may be used as a reference. For example, at transmitter station 13, the signal $fo/5$ is received, transformed to reproduce $fo$, and $fo/6$ is then derived therefrom as stated above.

The frequency changes as imparted upon one of the transmitters are very small because $Vk/Vo$ is in the order of $10^6$ to $10^7$. The generator 15 for $\Delta f$ may, for example, be a rotating coil. Thus, a magnetic high frequency rotating field is produced, having frequency $fo/6$. A coil is provided transverse to that field and rotates mechanically rather slowly. A voltage is induced in the rotating coil and the frequency of that voltage is the sum of the field frequency and of the mechanical rotational frequency. That sum is used for control of the output stage of that particular transmitter. Upon control of the mechanical rotation, the incremental frequency $\Delta f$ is controlled so as to control and possibly vary the desired vehicle speed $Vk$. such control in time may be desirable for adaptation of the system to different weather and road conditions, traffic density and, as stated above, emergency situations.

In order to avoid collision accidents, it is necessary that two vehicles travelling along the same track keep a minimum safe distance from each other. Two vehicles that have their controls operate to track the same discrete point will clearly collide. A minimum distance between two vehicles is, thus, the distance between two discrete phase points, as they travel along the h.f. cable. That distance depends upon the frequency $fo$. However, for reasons of irregular vehicle motion an "unused" discrete point should remain between two vehicles. Accordingly, the control frequency $fo$ of the system is selected in accordance with the equation $fo = Vo/4s$, wherein $s$ is the minimum distance from vehicle to vehicle and $Vo$ is the propagation speed for the h.f. signals in cable 10.

The basic principles mentioned above will establish a system in which these discrete points propagate at constant speed along the h.f. cable as the control mechanism in each vehicle will tend to control vehicle propagation accordingly. It has to be observed, however, that the speed along the road should not necessarily be a uniform one. Sharp curves and hills, transition lanes leading from one highway to another require usually a lower speed. Also, the entrance or on-ramp of such a controlled highway is preferably provided for relative slow speed, gradually changing into higher speed. In accordance with another feature of the invention, it is, therefore, suggested to lower the propagation speed of high frequency energy locally in cable 10.

Generally speaking, the propagation speed of the h.f. energy in cable 10 is inversely proportional to the square root of the product of dielectric constant and permeability of the propagation medium. To lower the propagation speed that product has to be increased, for example, by including ferromagnetic material in the dieelectric material that is part of the cable. This, however, is just one of the basically known methods to increase the product of transmission line inductivity and transmission line capacity so that the propagation speed of high frequency energy, and, therefore, the speed of the discrete phase points, as compared with the speed along other portions of the cable, is reduced. It follows that the speed of the vehicle is controlled to a lower value along such portions of the cable whereby also automatically the distance $s$ between the vehicles is lowered upon reduction of velocity, ($s = Vo/4fo$) as the distance between the propagating discrete phase points is reduced along those cable portions accordingly.

The vehicles are maintained on the respective track by operation of means as they are known per se. This is mentioned here only to demonstrate that the inventive method and system meets all three of the requirements mentioned in the introduction. Two pickup coils are provided on each vehicle, and they are connected to circuitry that is responsive to the strength of the high frequency field as pick-up from the high frequency cable. The signal amplitudes or envelopes are compared and, e.g., their difference or ratio is used as command input for an automatic steering mechanism of the vehicle. For this, it is, of course, best to provide the cable on and along the center line of the particular lane, and the controlled steering mechanism of the vehicle maintains the vehicle centrally above that cable. Of course, the cable may be provided as an overhead line, and the vehicle is steered to remain centrally under that line. In case the cable is disposed alongside the road (which may be more economical) the steering control has to respond to a particular ratio (other than unity) for the picked up signals. The particular steering control circuit is preferably tuned to one of the two frequencies as they are readily available, but it is basically possible to feed a third frequency into the cable for steering control. Employment of additional frequencies for steering is of advantage for other reasons, namely in case of branching, so that the continuing path and the branch path are identified by different steering control frequencies. Adjusting of the receiver for steering control to one particular frequency safeguards that the vehicle remains on the desired track and enters (or avoids) a highway branch. One can think here of a signal representation of highways having different numbers, as is conventional. Sometimes different highways have a common section, but split at either end of such section. As can readily be seen by providing different steering frequencies corresponding to different numbers of highways, the vehicle will be maintained on the "right track."

As stated, the inventive method lends itself to utilization of one of the signals for steering. However, also selective steering and branching can be provided for directly. For practicing this particular aspect of the inventive method, it can be assumed, for example, that the signal of frequency $fo/5$ is transmitted from starting points of one or two highways. It is assumed in both cases that there is a common section from which the two highways branch toward different destination points. The transmitter at the destination end of one of the two branching highways feeds $fo/6 + \Delta f$, and the transmitter at the end of the other highway feeds frequency $fo/4 - \Delta f$ into the cable. Production of the incremental frequency $\Delta f$ at the different locations must be synchronized, and the relative phases of the several signals must be adjusted, so that the phase points of the $fo/5 \Leftrightarrow fo/6 + \Delta f$ comparison and of the $fo/5 - fo/4 \Leftrightarrow \Delta f$ comparison, coincide at least approximately.

The common portion of the cable receives all frequencies, but a vehicle tuned to a particular pair of frequencies is automatically guided in the correct branch. On the other hand, the relation of the frequencies, as stated, makes it readily possible that the discrete points, including the points in the common section where the vehicles with different destinations may propagate and intermingle, still remain at the proper distance between the vehicles, particularly, if the vehicles have at least twice the minimum distance ahead of the point of merging traffic.

A particular point that has to be considered is, that, depending upon selection of the type of high frequency cable, but to some extent in all cases, the signal frequencies are attenuated as they propogate along the cable. It is, therefore, necessary to make sure that a minimum field strength is available along the cable for pick-up, and this, in turn, requires placement of amplifiers within the transmission line. The two different frequencies require amplification in different directions so that it is necessary to separate the two frequencies, as originating in the two different transmitters.

The amplifiers must be operated in phase synchronism as to respective input and output, so that there is no phase jump; i.e., the discrete points must travel through the amplifiers without change in speed.

The invention is not limited to the embodiments described above but all changes and modifications thereof not constituting departures from the spirit and scope of the invention are intended to be included.

I claim:

1. A method of controlling the motion of vehicles along a prescribed path comprising the steps of:
   providing a high frequency cable for developing partial external field along said path to radiate high frequency energy along that path;
   feeding h.f. energy of a first frequency into the cable, from one end thereof and to propagate therein in a direction away from the feed-in point;
   feeding h.f. energy of a second frequency into the cable from the opposite end to propagate therein in the opposite direction, the first and second frequencies both being approximately subharmonics of a particular frequency, the total deviation of both of the first and second frequencies from respectively being a true subharmonic of the particular frequency representing a phase point velocity along the cable;
   detecting, in a vehicle in the vicinity of the cable, signals of the first and second frequencies;
   detecting, in the vehicle, particular harmonics in each of the detected signals and comparing the phase between the separately detected harmonics; and
   controlling motion of the vehicle in response to the phase comparison.

2. A method as in claim 1, wherein the motion of the vehicle is controlled to maintain a constant phase between the harmonic as derived from the signal of the first frequency and the harmonic as derived from the signal having the second frequency.

3. A method as in claim 2, wherein the motion is controlled to maintain a + 90° phase difference.

4. A method as in claim 2, wherein the motion is controlled to maintain a − 90° phase difference.

5. The method as in claim 1, wherein the first frequency is a true subharmonic of the particular frequency, the second frequency is a composite frequency that includes another true harmonic of the particular frequency and an incremental component representing the phase point velocity.

6. The method as in claim 5, wherein the incremental component is equal to twice the second frequency multiplied by the ratio of phase point velocity and wave propagation velocity in the cable.

7. The method as in claim 5, providing the second frequency by first providing an h.f. rotating field having frequency of the other true harmonic, and providing a rotating coil in the field, to derive therefrom the composite frequency as second frequency to be transmitted through the cable.

8. The method as in claim 1, wherein the particular frequency is selected to be equal to the propagation speed of high frequency energy within the cable divided by four times the distance to be maintained between two succeeding vehicles.

9. The method as in claim 1, comprising the step of selecting a relatively reduced wave propagation velocity in portions of the high frequency cable as compared with the wave propagation velocity in other portions of the cable, in accordance with a reduced desired phase velocity in the vicinity of the cable.

* * * * *